United States Patent
Chiu

(10) Patent No.: US 6,906,929 B2
(45) Date of Patent: Jun. 14, 2005

(54) COMPUTER BACKPLANE WITH AN ACCELERATED GRAPHICS PORT

(75) Inventor: Tsai-Sheng Chiu, Taipei Hsien (TW)

(73) Assignee: ICP Electronics Inc., Shi-Chih (TW)

( * ) Notice: Subject to any disclaimer, the term of this patent is extended or adjusted under 35 U.S.C. 154(b) by 20 days.

(21) Appl. No.: 10/065,236

(22) Filed: Sep. 27, 2002

(65) Prior Publication Data

US 2003/0123219 A1 Jul. 3, 2003

(30) Foreign Application Priority Data

Dec. 31, 2001 (TW) ....................... 90224237 U

(51) Int. Cl.⁷ .............................................. H01R 12/16
(52) U.S. Cl. ..................... 361/788; 361/803; 710/301
(58) Field of Search .................... 361/788, 684–686, 361/728–730, 803, 796–799; 710/104, 301, 9–10, 305, 311–315

(56) References Cited

U.S. PATENT DOCUMENTS

| | | | | |
|---|---|---|---|---|
| 5,440,755 A | * | 8/1995 | Harwer et al. ............... 710/315 |
| 5,604,871 A | * | 2/1997 | Pecone ......................... 710/301 |
| 5,754,796 A | * | 5/1998 | Wang et al. ................. 710/301 |
| 5,852,725 A | * | 12/1998 | Yen .............................. 710/301 |
| 6,044,411 A | * | 3/2000 | Berglund et al. ............... 710/9 |
| 6,147,863 A | * | 11/2000 | Moore et al. ................ 361/686 |
| 6,289,405 B1 | * | 9/2001 | Movall et al. .............. 710/104 |
| 6,349,037 B1 | * | 2/2002 | Draughn et al. ............ 361/788 |
| 6,400,843 B1 | * | 6/2002 | Shu et al. .................... 382/167 |

* cited by examiner

Primary Examiner—Kamand Cuneo
Assistant Examiner—Tuan Dinh
(74) Attorney, Agent, or Firm—Winston Hsu

(57) ABSTRACT

A computer backplane is disposed with at least an AGP slot, a PCI slot and/or an EISA slot. The PCI slot can be used to electrically connect with PCI cards. The EISA slot and the PCI slot are in alignment to allow that a CPU card can be connected simultaneously to both the EISA slot and the PCI slot. The AGP slot is used to electrically connect with an AGP card. Such an arrangement allows for ease of replacement of the AGP card and a lower production cost.

2 Claims, 4 Drawing Sheets

COMPUTER BACKPLANE WITH AN ACCELERATED GRAPHICS PORT

BACKGROUND OF INVENTION

1. Field of the Invention

The present invention relates to a blackplane, and more particularly, to a computer backplane disposed with an accelerated graphics port (AGP).

2. Description of the Prior Art

Advancements in information technology have driven the rapid development of the entire computer industry, causing wide usage of personal computers and notebooks in all kinds of the industries. This is especially true in a manufacturing industry, which widely uses industrial computers to produce many different products. In order to increase productivity, improvement of major peripherals applied in industrial computers, such as motherboards, graphics cards, and hard disk drives, is required for high-speed calculation, fast display, and high-volume storage.

Practically speaking, in the fields of industrial computer, a computer server must simultaneously maintain communication with many other computers, or perform a remote control via terminals. Whether it's to perform a communication or remote control, the display card must be used to manipulate operative images and send the images back and forth among the server and the other computers or terminals. The image manipulation, which typically hinges on a transmission speed of the display card, is intimately connected to the production process. It means that the graphical speed of the images mostly depends on a bus specification of the display card.

Traditionally, several display cards have to be in compliance with the Peripheral Component Interconnect (PCI) interface specification. However, with an increase of image transmission volumes, the transmission speed in PCI specification is not fast enough to meet the present requirements. Therefore, a new, faster interface standard for image signal transfer is needed, and AGP is more used to be a needed display interface standard. Please refer to FIG. 1, which is a basic architectural diagram of a traditional computer backplane with an AGP.

Although the traditional computer backplane 100 utilizes an AGP expansion slot 102 to perform image transfer, the AGP slot 102 is soldered directly onto a CPU interface card 104. An AGP display card 108 is inserted into the AGP slot 102, and an AGP flat cable (not shown) is connected to a monitor. The CPU interface card 104 is directly inserted into an expansion slot 106 mounted on the backplane 100. However, the AGP display card 108 is horizontally inserted into the AGP slot 102 but oriented vertical to, and away from, the CPU interface card 104. Such an insertion may easily occupy a space required for other neighboring expansion slots, resulting in reduction of the number of other usable interface cards.

Although the AGP display card 108 can be traditionally designed as an on-board display interface of the CPU card 104, this may cause the display interface irreplaceable. When the user must selectively use different types display interfaces for different applications, the on-bonid AGP is rendered useless and a waste. In other words, the user must pay the cost of the on-board AGP card 108, and loses the ease of replacement to use other display cards.

Thus improving allocation of the AGP card and raising ease of replacement of the AGP card is an important issue for designers.

SUMMARY OF INVENTION

Therefore, it is an objective of the claimed invention to provide a computer backplane with a proper AGP expansion port architecture to raise ease of replacement of an AGP card in the backplane for a user or a designer.

It is a further objective of the claimed invention to provide the computer backplane, by way of addition of an AGP expansion slot onto the computer backplane, allowing a user to selectively use anyone proper AGP card to be installed thereon, and speeding up the image signal transmission in the system.

According to the above-mentioned goals, the claimed invention is a computer backplane disposed with an AGP. In a first embodiment, the computer backplane at least has a PCI expansion slot, an EISA expansion slot, and an AGP expansion slot. The PCI expansion slot is used to connect a PCI interface card, and uses a PCI bus for data transfer to provide PCI interface card functionality. The EISA expansion slot and the PCI expansion slot are arranged in alignment, allowing a CPU interface card to be simultaneously inserted into the PCI slot and the EISA slot. The AGP slot is disposed onto a mainboard to electrically connect an AGP interface card. The AGP slot is disposed beside the EISA slot.

In a second embodiment, a computer backplane has at least a PCI expansion slot, a first AGP expansion slot, and a second AGP expansion slot. The PCI expansion slot is used to connect a PCI interface card, which performs functionality of the PCI interface card through data transmissions in PCI bus. The first AGP expansion slot is aligned with the PCI expansion slot whereby a CPU interface card can be simultaneously inserted into the PCI slot and the first AGP slot. The second AGP slot is an extension electricity of the first AGP slot to connect an external AGP interface card therein.

In a third embodiment, a computer backplane has an EISA expansion slot and an AGP expansion slot. The EISA expansion slot is used to connect an EISA interface card, which performs functionality of the EISA interface card through data transmissions in EISA bus. The AGP slot is disposed beside the EISA slot to connect an external AGP interface card therein.

It is an advantage of the claimed invention that the computer backplane, by way of addition of an AGP expansion slot onto the computer backplane, allows a user to selectively install a proper display card thereon, and speeds up data transmissions in an industrial computer. Thus, additional disposal of the AGP expansion slot raises ease of replacement of an AGP card for use of the computer backplane.

These and other objectives of the claimed invention will no doubt become obvious to those of ordinary skill in the art after reading the following detailed description of the preferred embodiment, which is illustrated in the various figures and drawings.

DETAILED DESCRIPTION

To resolve said disadvantage of conventional computer backplanes of industrial computers, which lack an AGP, the present invention provides a computer backplane with addition of an AGP expansion slot thereon, thereby allowing a user to selectively install a required AGP display card thereon and speeds up image transmissions in the industrial computer. Thus, ease of replacement of an AGP interface card used in the computer backplane can be raised. Following is a detailed description, with figures, of a user-configurable computer backplane according to the present invention.

Figure 1:
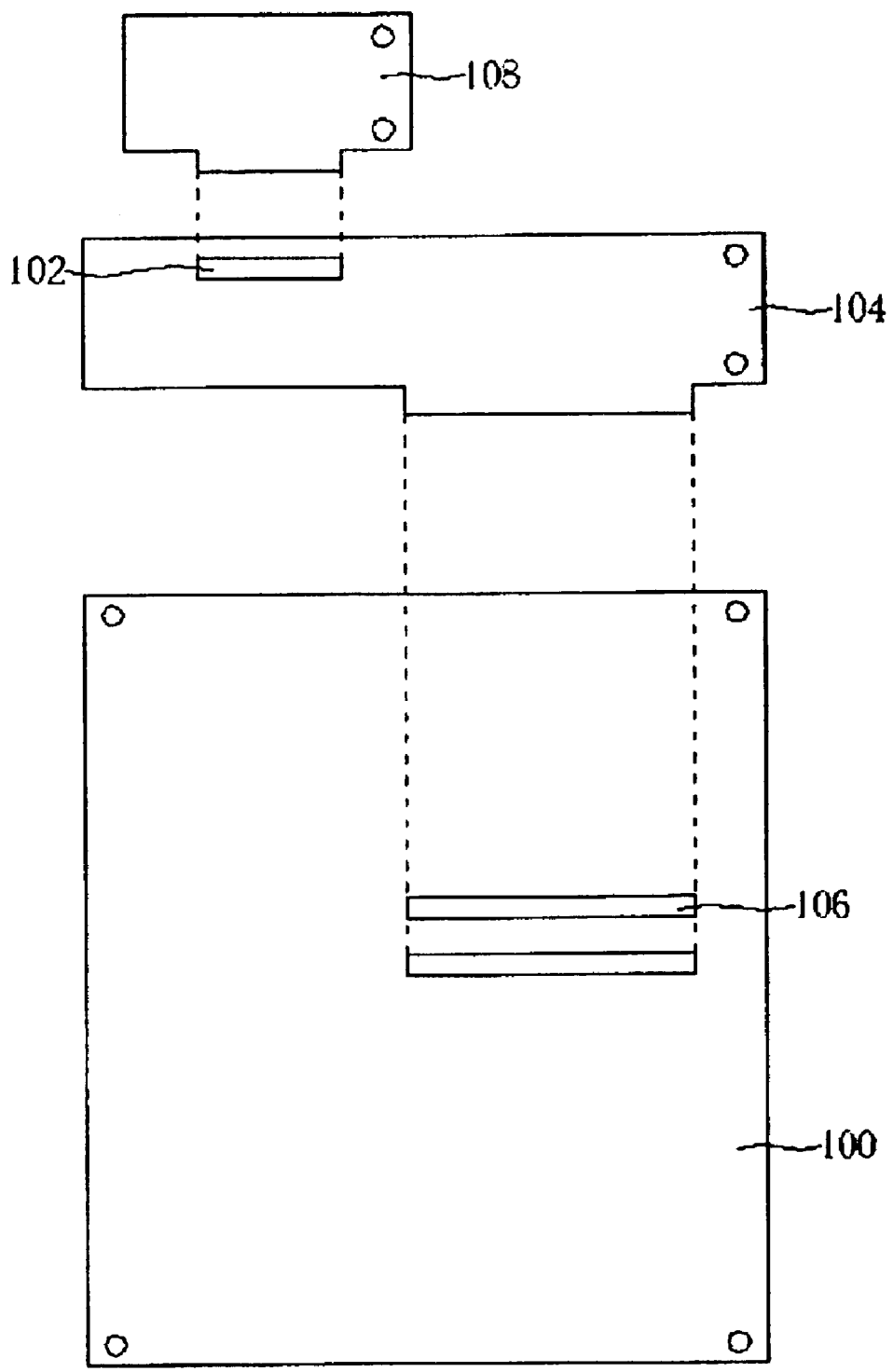
FIG. 1 is a basis-architectural diagram illustrating a configuration of a conventional computer backplane.
Figure 2:
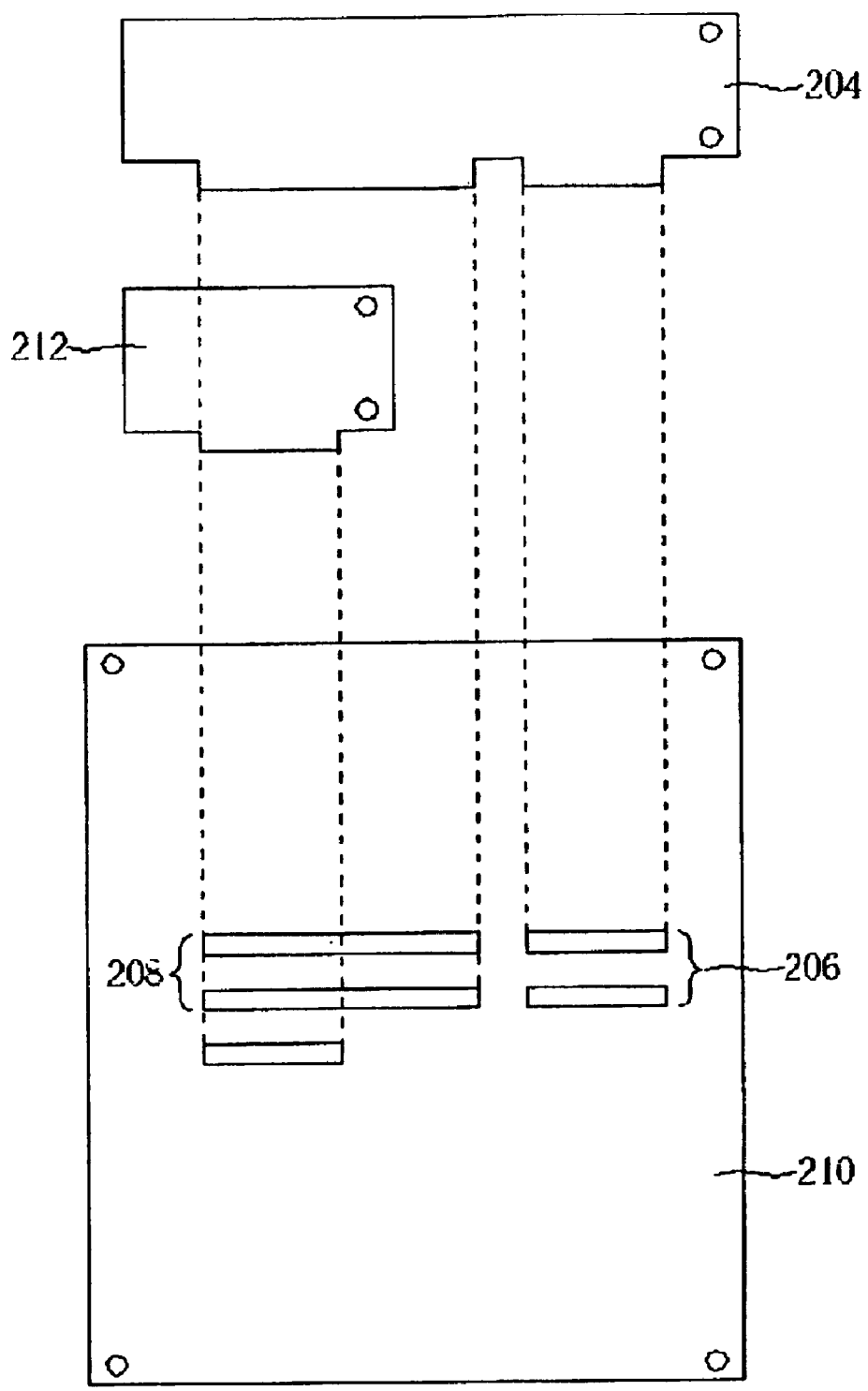
FIG. 2 is an architectural diagram illustrating a configuration of a first embodiment of a computer backplane according to the present invention.

Please refer first to FIG. 2, it shows a first embodiment of the present invention computer backplane 210 disposed with an AGP 200. The computer backplane 210 can be equipped with a CPU interface card 204 and other peripherals to constitute a computer system. The computer backplane 210 has a plurality of PCI expansion slots 206, a plurality of Extended Industry Standard Architecture (EISA) expansion slots 208, and an AGP expansion slot 200 disposed thereon.

Each PCI expansion slot 206 is set on the computer backplane 210 by either soldering or another method. Each PCI slot 206, aside from using a CPU interface card 204, can also accommodate therein other PCI interface cards, i.e. image processing cards, sound cards, or network cards, which expand the functionality of the industrial computer. The CPU interface card 204 is formed with a row of gold fingers for inserting into the PCI expansion slot 206, which functions as transmitting data over a PCI bus interconnecting between the PCI expansion slot 206 and the CPU interface card 204.

The EISA expansion slot 208 is positioned on the computer backplane 210, for example of being soldered onto the backplane 210. The EISA interface card is combined with the CPU interface card 204. As an improvement, each EISA expansion slot 208 can be aligned with a corresponding PCI expansion slot 206 thereby allowing the CPU interface card 204 to be simultaneously inserted into the PCI slot 206 and the EISA slot 208.

The AGP expansion slot 200 is set on the computer backplane 210, for example of soldering, and is used to connect with an AGP interface card 212. A graphics chip on the AGP card 212 processes image signals and sends processed signals to an installed monitor. The AGP expansion slot preferably is adjacent to the EISA expansion slot 208.

Figure 3:
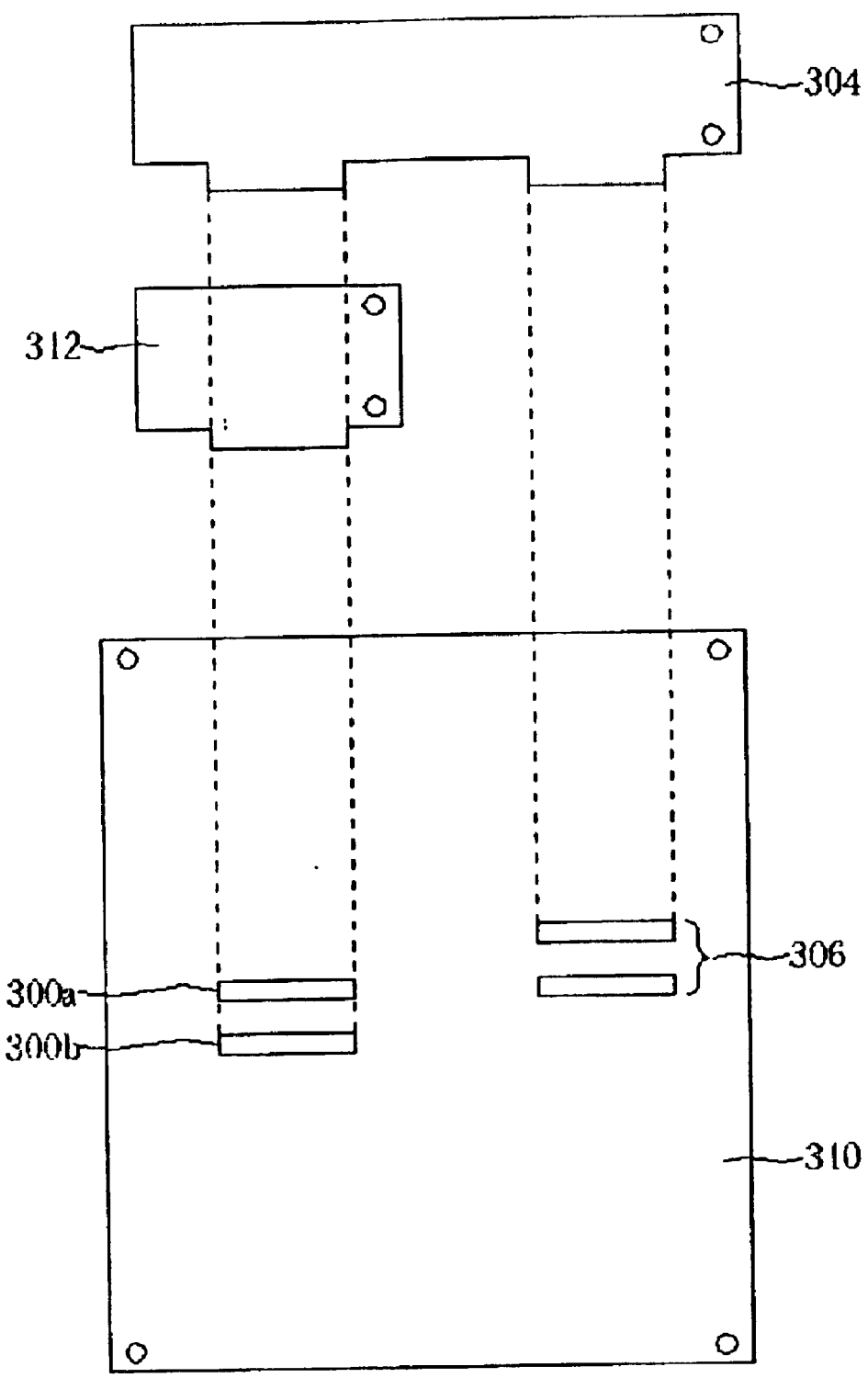
FIG. 3 is an architectural diagram illustrating a configuration of a second embodiment of a computer backplane according to the present invention.

Please further refer to FIG. 3, which shows a second embodiment of the present invention computer backplane with an AGP. The computer backplane 310 with an AGP expansion slot 300 comprises a plurality of PCI expansion slots 306, a first AGP expansion slot 300a and a second AGP expansion slot 300b. The backplane 310 also is complied with a CPU interface card 304 and other peripherals to constitute a computer system.

Each PCI slot 306 is electrically connected with the backplane 310 for expansion of a PCI interface card, which is able to perform data transmissions over a PCI bus. The PCI interface card comprises gold fingers, and could be of such types as: a sound card, a network card, or other interface cards. The first AGP expansion slot 300a is connected to the computer backplane 310 and is aligned with the PCI slot 306 thereby allowing a CPU interface card 304 to be simultaneously inserted into the PCI slot 306 and the first AGP slot 300a for electrical connection.

The second AGP expansion slot 300b is electrically connected with the computer backplane 310 to extend electricity of the first AGP slot 300a and receive an external AGP interface card 312 therein. Preferably, the first and the second AGP slots 300a&b are directly soldered to the backplane 310. The second AGP expansion slot 300b is used for expansion of the AGP interface card 312 with an AGP IC chip to process image signals.

AGP is primarily designed for display cards, which provides a special bus between a graphics chipset and a microprocessor. The AGP bus is particularly suited to 3D-Graphic rendering and animation software environments, allowing fast transfer of information between memory and the graphics chip. The computer backplane of the present invention is appropriate for AGP 1x/2x/4x, or even higher speed interface specifications.

Figure 4:
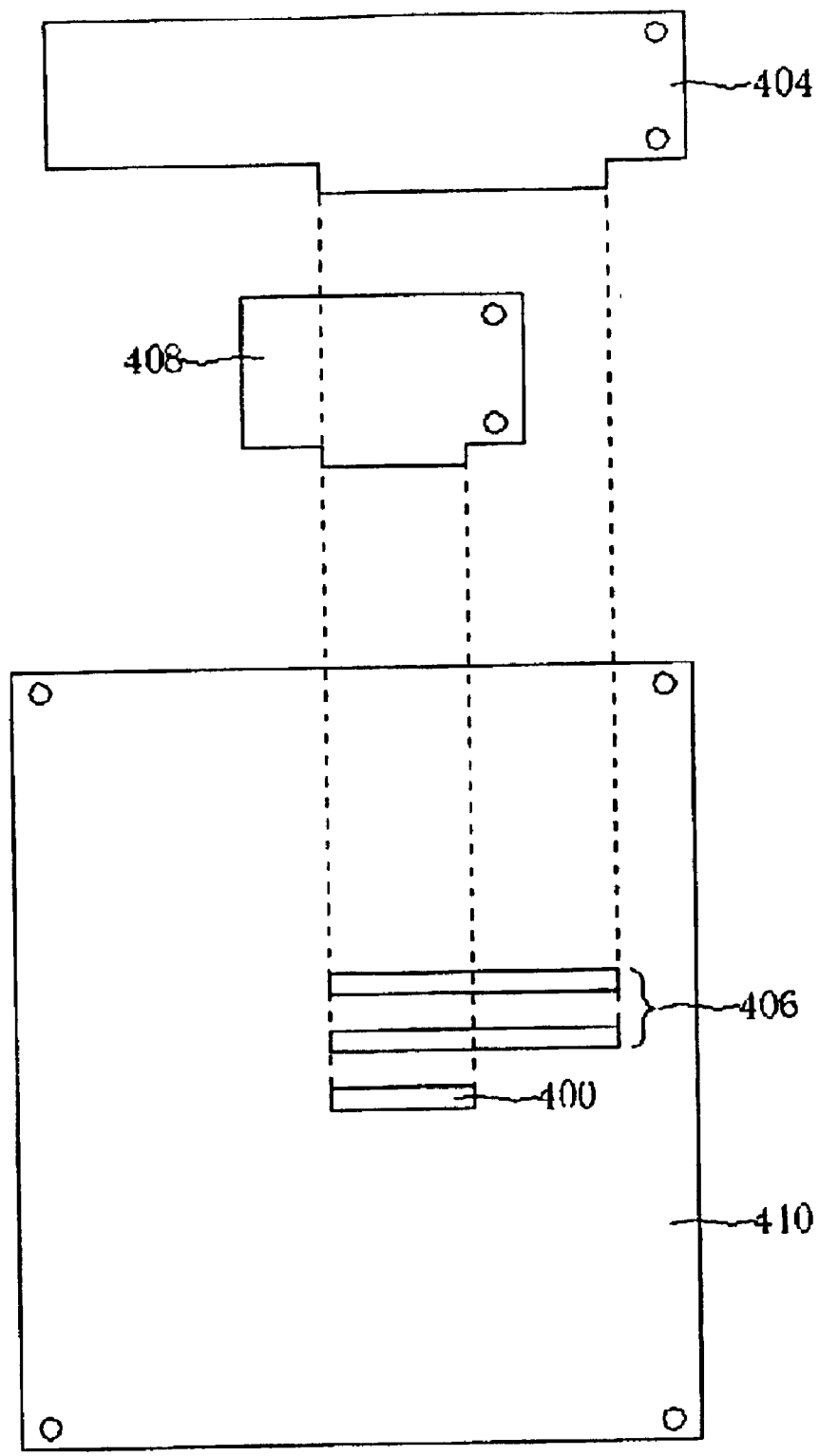
FIG. 4 is an architectural diagram illustrating a configuration of a third embodiment of a computer backplane according to the present invention.

Please further refer to FIG. 4, which shows a third embodiment of the present invention computer backplane with an AGP. In this embodiment, the computer backplane 410 with the AGP 400 can employ an EISA interface card 404 and other peripherals to constitute a computer system. The computer backplane 410 comprises a plurality of EISA expansion slots 406 and the AGP expansion slot 400.

Each EISA expansion slot 406 is electrically connected with the backplane 410 for receiving an EISA interface card 404 therein, such as a CPU interface card. The EISA slot 406 transmits data over an EISA bus to perform functionality of EISA interface card 404. The AGP slot 400 is also set on the backplane 410, for example of directly soldering the AGP slot 400 to the backplane 410. The AGP slot 400 is further adjacent to the EISA slot 406, and can be used to receive AGP interface cards 408 therein for electrical connection. The AGP card 408 made with gold fingers is used for inserting into the AGP slot 400. Data transfer between the AGP card 408 and the AGP slot 400 takes place over an AGP bus, including transmission of processed image signals to an installed monitor.

In the above-described three embodiments, the AGP expansion slot is set on the computer backplane. When the AGP interface card is installed into the AGP slot, the AGP card is positioned parallel to other cards in the computer thereby saving required space but not invading other space used by the other cards.

The present invention AGP expansion slot fitted with the AGP display card not only allows for high-speed data transfer to the graphics chip, but also can utilizea Unified Memory Architecture (UMA) technology to allow the display card to use a main memory of the computer system as a required graphic memory. It directly uses the main memory to store/access needed information thereby reducing the volumes of used expensive graphics memory.

The present invention computer backplane with an AGP, allows a user to select a required graphics card, and speed up a data transmission in an industrial computer. In addition, the present invention backplane provides upgradeable arrangement for interface card, which facilitates ease of replacement of the interface card and lower cost.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer backplane comprising:
   a PCI expansion slot disposed on the backplane;
   a first AGP expansion slot disposed on the backplane, in alignment with the PCI expansion slot to allow that a CPU interface card is able to be connected simultaneously into both of the PCI slot and the first AGP slot; and a second AGP expansion slot having an extension of electricity of the first AGP slot for receiving an external AGP interface card therein for electrical connection.

2. The computer backplane as described in claim 1, wherein the AGP interface card comprises gold fingers for electrically connecting the AGP interface card to the second AGP expansion slot.

* * * * *